United States Patent
Prestel et al.

(10) Patent No.: US 11,293,303 B2
(45) Date of Patent: Apr. 5, 2022

(54) CONNECTING ASSEMBLY FOR COOLING THE TURBINE OF A TURBINE ENGINE

(71) Applicant: Safran Aircraft Engines, Paris (FR)

(72) Inventors: Sébastien Jean Laurent Prestel, Moissy-Cramayel (FR); Baptiste Marie Aubin Pierre Jouy, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 557 days.

(21) Appl. No.: 15/804,738

(22) Filed: Nov. 6, 2017

(65) Prior Publication Data
US 2018/0128120 A1    May 10, 2018

(30) Foreign Application Priority Data

Nov. 8, 2016 (FR) ...................................... 1660784

(51) Int. Cl.
*F01D 25/12* (2006.01)
*F02C 7/18* (2006.01)
*F01D 11/24* (2006.01)
*F01D 25/24* (2006.01)

(52) U.S. Cl.
CPC .............. *F01D 25/12* (2013.01); *F01D 11/24* (2013.01); *F01D 25/24* (2013.01); *F02C 7/18* (2013.01); *F05D 2220/323* (2013.01); *F05D 2250/20* (2013.01); *Y02T 50/60* (2013.01)

(58) Field of Classification Search
CPC .......... F01D 25/12; F01D 25/24; F01D 25/28; F01D 11/24; F16L 23/028; F16L 41/084

USPC ......................................................... 415/177
See application file for complete search history.

(56) References Cited

U.S. PATENT DOCUMENTS

| | | | | |
|---|---|---|---|---|
| 4,879,975 A * | 11/1989 | Bennett | ................ | F02M 35/108 123/184.39 |
| 4,887,557 A * | 12/1989 | Sukimoto | ............... | F02B 75/22 29/890.08 |
| 5,349,817 A * | 9/1994 | Bekkering | ............ | F01N 13/008 60/322 |
| 5,400,951 A * | 3/1995 | Shiroyama | ........... | B23K 33/004 228/168 |
| 5,540,547 A | 7/1996 | Cole | | |
| 6,371,070 B2 * | 4/2002 | Munetoki | ........... | B29C 66/1222 123/184.61 |
| 9,701,433 B2 * | 7/2017 | Boukobza | .......... | B65D 21/0231 |
| 2011/0277429 A1 * | 11/2011 | Troxell | .............. | F02M 35/0203 55/385.3 |
| 2013/0094953 A1 * | 4/2013 | Spathias | ............. | F04D 29/4206 415/204 |
| 2014/0109596 A1 * | 4/2014 | Daguenet | ................ | F01D 11/24 60/796 |

(Continued)

FOREIGN PATENT DOCUMENTS

| | | |
|---|---|---|
| EP | 1 205 637 A1 | 5/2002 |
| EP | 1 798 381 A2 | 6/2007 |
| WO | WO 2013/001246 A1 | 1/2013 |

*Primary Examiner* — Robert A Werner
(74) *Attorney, Agent, or Firm* — Blank Rome LLP

(57) ABSTRACT

A connecting assembly comprising an air distribution housing, between an air inlet passage and at least one duct connected with the housing by at least one bush mounted on an orifice of a wall of the housing. The wall of the housing and an inner wall of the bush are connected by a fillet having a radius which is maximum over an angular sector.

10 Claims, 2 Drawing Sheets

(56) References Cited

U.S. PATENT DOCUMENTS

| | | | |
|---|---|---|---|
| 2014/0251585 A1* | 9/2014 | Kusuda | F28D 15/04 |
| | | | 165/164 |
| 2014/0346907 A1* | 11/2014 | Taniguchi | H02K 5/04 |
| | | | 310/89 |
| 2019/0024894 A1* | 1/2019 | Mongillo | F02C 3/04 |

* cited by examiner

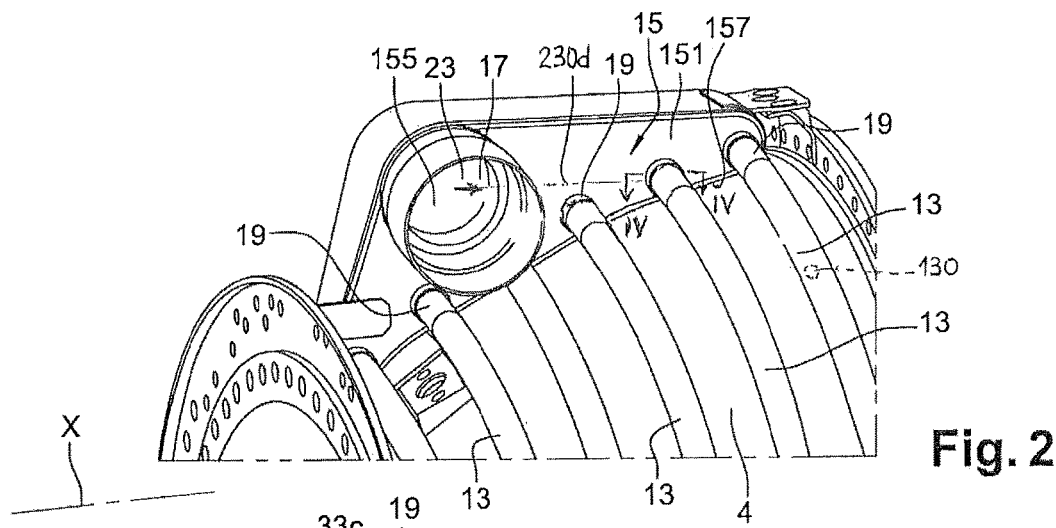
Fig. 2
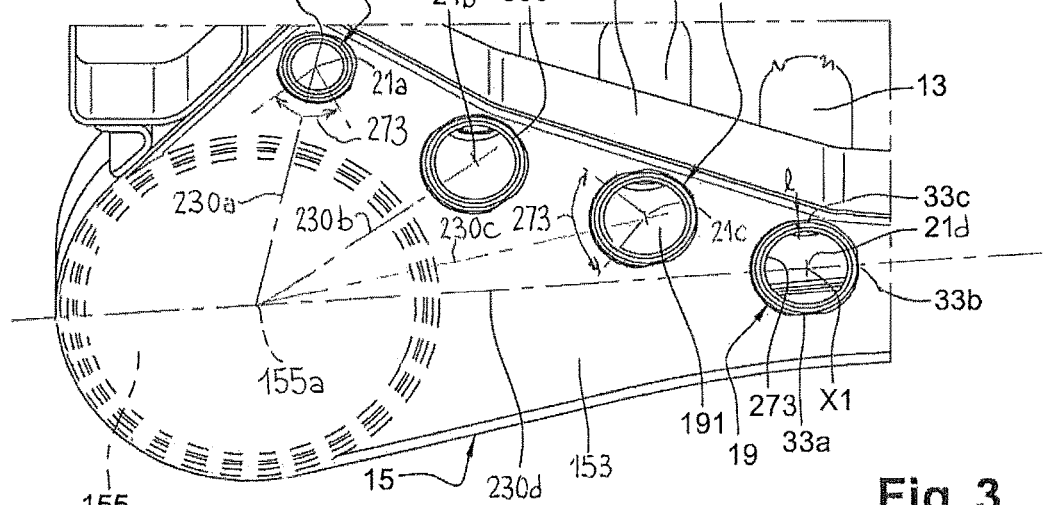
Fig. 3
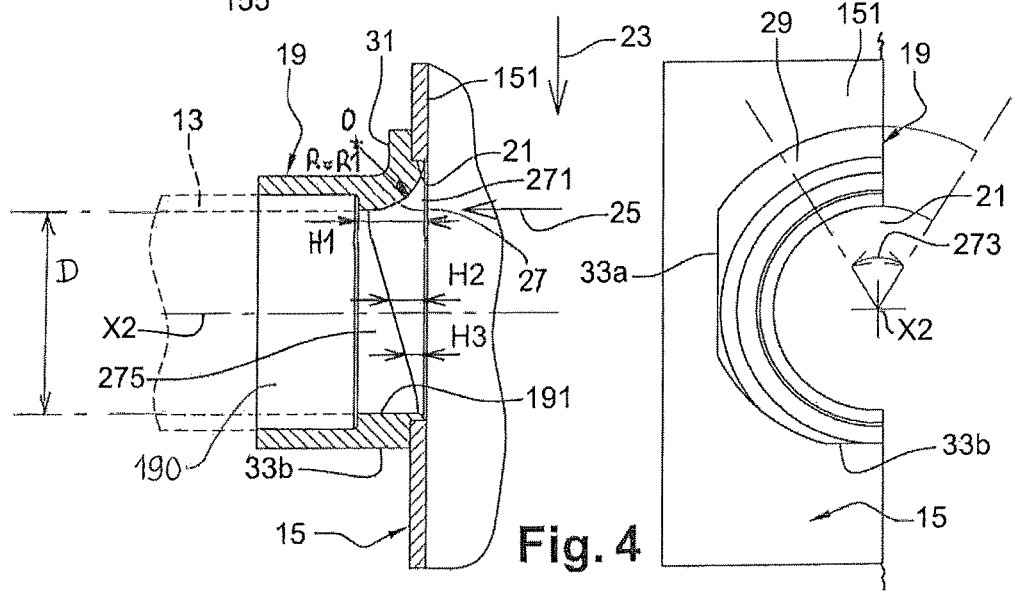
Fig. 4
Fig. 5

CONNECTING ASSEMBLY FOR COOLING THE TURBINE OF A TURBINE ENGINE

CROSS-REFERENCE TO RELATED APPLICATIONS

This application claims the benefit of French Patent Application No. 1660784, filed Nov. 8, 2016, the contents of which is incorporated herein by reference.

TECHNICAL FIELD

The invention provides for an assembly for connecting at least one duct with one air distribution housing (designated hereafter as air distribution housing, or housing, or distribution housing, indifferently).

The invention more particularly provides for such an assembly for a clearance control system in the turbine of a turbine engine which improves the connection of each duct with said housing.

BACKGROUND

Hereunder, and unless otherwise indicated (such as when a bush is referred to):

axis or axial means parallel to the axis of the turbine engine, i.e. the axis about which the rotating blades of such turbine engine rotate, radial means radial to such axis, upstream and downstream respectively define the inlets and outlets of gas, including air, which globally axially circulate in the turbine engine, inner/internal and outer/external define respective radial positions.

Controlling the clearance in the turbine of a turbine engine consists in controlling the distance between the ends of the rotating blades of the turbine and the stationary outer casing of the turbine in order to optimize the turbine output.

Such clearance control mainly consists in injecting, in a controlled way, cold air onto the outer casing, so as to control the expansion thereof.

Air is brought to the casing through a plurality of ducts, which are connected to an air distribution housing.

According to one known embodiment, the fluidic connection of each duct with the distribution housing is provided at one side wall of the housing, which includes a bush, which one end of the duct is connected to. Brazing typically provides tightness between the end of the duct and the associated bush.

Such a connecting assembly is known which comprises bushes and a housing for distributing air (e.g., an air distribution housing) between an air inlet passage of the housing and ducts, with each duct of said assembly being connected with the housing by one said bush mounted on an orifice of a first wall of the housing where air arrives. Each bush has an axis along which an inner wall extends, in contact with which air can circulate in the bush.

In WO2013001246, the connection between the inner volume of the housing and each duct is provided by means of an inner tube including a passage arranged in the cylindrical wall thereof and opening in the inner volume of the housing, for air circulation. Besides, each side wall concerned is so designed that the edge of each orifice is curved towards the inside of the housing, in order to form the matching bush which the inner tube is attached to, for instance by brazing.

In another embodiment, the bushes may be fitted into the orifices of the housing.

Air supply to the ducts problems arise anyway, whereas the air supply to the distribution housing seems correct.

Pressure losses have been noted. Such pressure losses originate from the connections between the ducts and the housing, according to surveys.

In the existing solutions, the passage of the orifices of the side walls of said air distribution housing does cause pressure losses, which reduces the efficiency of the cooling of the outer casing. This can be explained by the fact that the cooling ramps formed by the ducts are tangential whereas the distribution housing is globally axial. At the interface between the housing and the ramps, the elbows thus created tend to cause the separation of air, which reduces the air passage section. The resulting increase in speed induces a significant pressure loss, thus a reduction in the total pressure in the ramps. Now, such pressure is useful for efficiently cooling the outer casing. As a matter of fact, a reduction in the total pressure in the ramps has a negative effect on the air flow rate to the outer casing. The heat transfer coefficient in the casing is thus affected too.

The invention specifically aims at minimizing the risk that such a problem might arise, and more generally at favouring the cooling of the outer casing, which must be advantageous for controlling the clearance between the ends of the rotating blades of the turbine and the outer casing.

SUMMARY

The invention thus provides that the connecting assembly disclosed above should be such that said first wall of the housing and the internal wall of the bush can be connected together by means of a fillet with a radius varying on at least a part of the perimeter of said internal wall.

The bushes will typically be of the type fitted in the orifices of the housing, with one end of the matching duct engaging into the bush concerned.

Because of the fillet provided on at least one part of the perimeter of the internal wall of the bush, such internal wall may have no sharp edge, at on the air inlet side.

Besides, providing such a fillet, which evolves circumferentially, rather than a fillet having a circumferentially identical profile, made it possible to work on another aspect of the quality of the cooling by jets of air from the outer casing.

As a matter of fact, it has been demonstrated that providing, thanks to the latter, a priori specifically where the radius is the smallest, at least one, and preferably several flat lug(s) located angularly, about said axis, at a distance from a zone of the perimeter of the bush where the radius of the fillet tends to a maximum, made it possible to position the considered ramps as close as possible to the casing, which must favour the efficiency of the cooling thereof.

Providing such flat lugs on the external wall of each bush will additionally facilitate the positioning of the bushes on the air distribution housing. Three angularly separated flat lugs can specifically be provided. This will make it possible to visually check the correct positioning of the bushes, in a practical, reliable and quick way. Besides, such solution will make it possible to use conventional tools for positioning the bushes.

More specifically, two opposite flat lugs may be provided for the direction and one angularly intermediate flat lug may be provided for the sense.

Considering the above-mentioned technical field, another aspect of the invention naturally relates to a turbine engine for an aircraft, characterized in that it comprises:

an assembly as disclosed above, which comprises several so-called ducts and bushes, and an outer casing of a turbine about a zone of which is positioned said housing for distributing air, a second wall of which extends to be adjacent to said zone of the outer casing, therealong.

The risk of air separation, and thus the reductions in the air passage section in the bushes, at the change in direction, when air flows from the housing to the bushes, will thus be limited by providing, on such turbine engine, the radius of the fillet tending to a maximum at the place of a zone of the perimeter of said internal wall which is oriented towards the air inlet passage. Pressure losses will then be limited.

And, in order to position the orifice(s) of the housing, bushe(s) and ducts concerned as close as possible to the outer casing of the turbine, for the cooling thereof, as mentioned above, the turbine engine, may, in another aspect, be such that the bushes:

are mounted on the orifices of the housing so as to be adjacent to said second wall of the housing, and each have an external wall with a periphery provided with at least one flat lug, which, on at least some of the mounted bushes, will be positioned so as to be immediately adjacent to said second wall of the housing.

Besides, if, additionally or alternately, the bushes are, on the turbine engine, mounted on the orifices of the housing and each have several peripheral flat lugs angularly positioned about said axis, at a distance from the sector of a perimeter zone of said internal wall where the radius of the fillet tends to a maximum, the following will again be possible:

facilitating the positioning of the bushes on the air distribution housing, multiply the possible orientations of a bush, so as to position one of the flat lugs opposite said second wall of the housing, which will thus make it possible to reduce the distance between the bush and the outer casing to be cooled, preserve the quality of the air flow at the bush inlets.

BRIEF DESCRIPTION OF THE DRAWINGS

If need be, the characteristics of the solutions disclosed herein will be better understood, and other details and advantages thereof will appear upon reading the following description given by way of a non restrictive example while referring to the appended drawings wherein:

FIG. 2 is an external local view in perspective of the elements shown in FIG. 1, FIG. 3 is a local view in reverse perspective of the air distribution housing;

and FIGS. 4, 5 respectively are a section along the IV-IV line of FIG. 2 and a corresponding front view of the bush mounted there.

DETAILED DESCRIPTION

Figure 1:
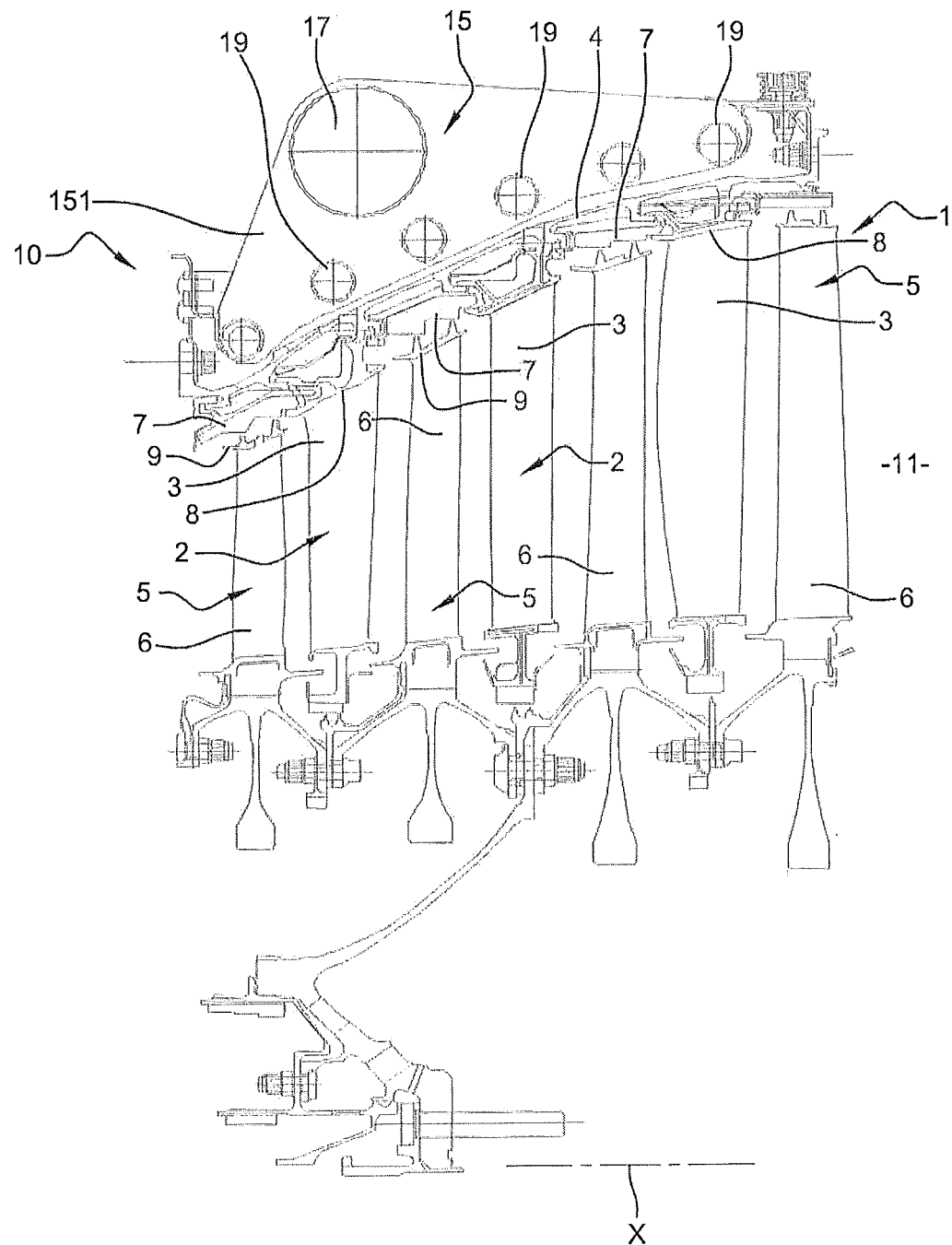
FIG. 1 is a schematic longitudinal section of a turbine of an aircraft turbine engine equipped with an air distribution housing according to the invention.

FIG. 1 shows a low pressure turbine 1 of a turbine engine 10 comprising several turbine stages stepping along the axis X of the turbine engine.

Each stage includes a distributor 2 having stationary vanes 3 and supported by an outer casing 4 of the turbine, and a rotor wheel 5 mounted downstream from distributor 2, and having rotating blades 6.

The distributors 2 each comprise respectively internal and external walls of revolution 8 which are radially connected together by the vanes 3.

The blades 6 rotate about the axis X, in a substantially truncated enclosure formed by ring sectors 7 circumferentially supported end to end by the outer casing 4 of the turbine.

The rotor blades 6 are integral with a turbine shaft, and each comprises respectively external 9 and internal flanges.

The internal and external walls of revolution and the external and internal flanges together define an annular jet 11 of gas flowing into the turbine.

In order to control the clearance between the ends of the external flange 9 of the rotating blades 6 of the turbine, and the—stationary—outer casing 4, air is thus injected onto the outer casing, so as to control the expansion thereof according to the turbine operating conditions.

Relatively cold air is supplied to the outer casing 4 through a plurality of ducts 13, which are connected to an air distribution housing 15.

Beforehand, air reaches the housing 15 through a feed tube 17. The housing 15 distributes the air to the ducts 13, like a plenum chamber.

The ducts 13 are perforated tubes (a few orifices 130 are illustrated in FIG. 2).

Each duct 13 is connected with the housing 15 at the side walls of the housing, one 151 of which can be seen in FIGS. 1, 2, with the opposite one 153 being visible in FIG. 3.

The air provided by the feed tube 17 goes into the housing 15 through an air inlet passage 155 provided in one (so-called first) wall among the side walls thereof.

In the disclosed and illustrated solution, bushes 19 make it possible to connect the ducts 13 and the housing 15, through orifices 21 provided in the side walls 151 or 153 of the housing.

Each bush 19 is fitted into the matching orifice 21 of the housing 15, as shown in FIG. 4.

And one end of the corresponding duct 13 is mounted in the bush 19, for instance fitted into same, as shown. Brazing may be used to provide tightness.

Each bush has a through passage 190 with an internal wall 191 in contact with which air can circulate, after reaching the concerned orifice 21.

In FIGS. 2, 4, the arrow 23 shows the general direction of the air circulation from the air inlet passage 155 to the bush 19 concerned by FIG. 4. In such FIG. 4, the arrow 25 shows, after the curvature, the arrival of air at the matching orifice 21 and then in the bush.

Transversality between the housing 15 elongation axis X1 and the axis of the bushes (refer to the axis X2 for the bush in FIGS. 4, 5) induced that, for the quality of the air circulation at the bush 19 inlet, the first wall (here 151) of the housing is connected with the internal wall 191 of the bush by a fillet 27 having a radius R which varies over at least a part of the perimeter of the internal wall 191. Such fillet is tangent. In FIG. 4, the position, at the place concerned, of the centre of the generant arc of circle, located outside the bush 19, has been marked with an O.

Such fillet 27 will then provide, parallel to the axis X2, a greater flaring depth over a sector 273 of the perimeter 275 than anywhere else on such perimeter (see the depths H1, H2, H3 in FIG. 4).

Such flaring depth is defined, parallel to the axis X2, by the radius R set between the two walls 151 and 191, perpendicular to each other, to be connected together. The radius R of the fillet 27 may vary as follows, on the perimeter of the orifice 21, between the smallest and the largest radius:

| inner Ø (D) of the duct 13(cm) | Radius R (cm) |
|---|---|
| 12 to 13. | 0.5 to 3. |
| 15 to 16. | 0.5 to 4. |
| 19 to 20. | 0.5 to 5. |
| 25 to 26. | 0.5 to 7. |

Each duct 13 will then advantageously have an inner diameter D between 12 and 26 cm and the radius R of the fillet 27 will vary accordingly from 0.5 to 7 cm.

The largest radius R1 may be set to be constant over an angular sector (reference number 273 in FIGS. 3 and 5) between 90° and 135°, preferably of the order of 120°, within 10°. The most important depth H1 will then be set in this sector.

As a matter of fact, to have the air circulating in the direction 23 (FIGS. 2 and 4) change its path towards the transversal direction 25 with limited risks of separation at the inlet into the corresponding bush, when passing into the orifice 21, the radius of the fillet 27 tends to a maximum R1 at a zone of the perimeter of the internal wall corresponding to the above-mentioned sector 273 and which is oriented towards the air inlet passage 155; refer, for example to the direction 230d in FIGS. 2 and 3 and the fillet at the top of the illustration in FIG. 4 or 5.

As illustrated in FIG. 3, on a housing 15, the bushes 19, and thus the orifices 21 thereof, are typically substantially aligned along a zone of the outer casing 4, at various distances from the passage 155. As illustrated in FIG. 3, it can additionally be considered that the air inlet passage 155 and the orifice 21 of each bush 19 have centres (respectively 155a and 21a to 21d in the Figure) through which respective straight lines (230a to 230d in the Figure) pass which show that the air from the air inlet passage 155 reaches the orifices 21 of the bushes 19 in various directions. The above-mentioned direction 23 is one of these.

For the already mentioned purposes, and taking account of such design of the housing 15 and the internal distribution of air, it has been decided that the radius R of each fillet 27 should be maximum (R1) over an angular sector 273 centred on the corresponding straight line, open towards the air inlet passage 155 where the air comes from, and ranging from 90 to 135°, as illustrated for two bushes in FIG. 3. An angular sector of 120°, within 10°, is still preferred.

The maximum (R1) value of the radius R may be constant all over the sector 273.

To be positioned on, supported by the housing 15 and to be tight, the buses 19 may each have an external peripheral rim 31, at the external wall 29 thereof, toward the axial end where they have a fillet.

At a distance from the sector 273 of the perimeter 275 where the flaring depth is the greatest (H1), thus of the angular zone where the radius R is maximum (R1) and may be constant, the external rim 31 may be truncated by one or more flat lugs 33a, 33b, 33c (see FIG. 3) positioned angularly about the axis X2 of the through passage 190.

A second advantage will be to additionally avoid affecting efficiency in the flowing of air, which is affected by the fillet.

As a matter of fact, at this sector 273, the radius R1 of the fillet 27 would be truncated (which is inappropriate), if a flat lug were arranged therein.

Two diametrally opposed flat lugs 33a, 33c are provided for the direction, and an angularly intermediate flat lug 33b is provided between the two other ones, for the sense.

As a matter of fact, the flat lug 33b positioned diametrally opposite the angular zone where the radius R is maximum (R1) makes it easier, when positioning a bush relative to its orifice 21, to identify the angular orientation of such bush about the axis X2. The bush is thus well positioned relative to the optimal direction materialized by the corresponding straight line 230a-230d and the radius R1 is so oriented as to face the air intake 23.

As for the two other angularly intermediate flat lugs 33a, 33c between the sector 273 and the flat lug 33b, they can more particularly be used to angularly move the bush, for the positioning thereof, since they are located diametrally opposite one another.

Besides, such flat lugs may enable to use conventional tools (such as pliers) for positioning the bushes.

Eventually, such flat lugs may make it possible to position the ducts 13 radially closer to the outer casing 4.

As a matter of fact, as can be noted when comparing FIGS. 2 and 3, an elongated, transversal (so-called second) wall 157 of the air distribution housing 15 globally extends along the outer casing 4, immediately adjacent to the zone (or part) of such casing which is thus covered, so that the air leaving the passages 130 of the ducts 13 is blown onto the outer casing 4, as close thereto as possible.

The transversal wall 157 of the housing 15 is globally elongated substantially parallel to the axis X.

At least one flat lug, here the flat lug 33b is provided to be angularly located diametrally opposite the sector 273, so that the ducts 13 are as close as possible to the outer casing 4.

FIG. 3 thus shows that, as the bushes 19 are mounted on the orifices 21, they are immediately adjacent to the second transversal wall 157 of the housing 15, with one of the flat lugs (33c in fact) being oriented towards the wall 157 in order to reduce the distance between the wall 157 and the bush considered.

The invention claimed is:

1. A turbine engine for an aircraft, comprising:
   a connecting assembly comprising:
      a housing for distributing air between an air inlet passage of the housing and a plurality of ducts via a plurality of orifices of a first wall of the housing,
      a plurality of bushes, each of said plurality of bushes connecting a respective one of the plurality of ducts to a respective one of the plurality of orifices to allow air to circulate in contact with an inner wall of the respective bush and in a first direction from the housing into the respective duct, and
      a plurality of fillets each configured to connect an inner wall of a respective one of the plurality of bushes to a respective inside portion of said first wall of the housing, and having a radius which varies over at least a part of a perimeter of said inner wall to divert air from a second direction within the housing to the first direction, the first direction being different than the second direction; and
   an outer casing of a turbine of the turbine engine, about a zone of which is positioned the housing for distributing air, a second wall of which extends to be adjacent to said zone of the outer casing.

2. The turbine engine of claim 1, wherein said each of said plurality of bushes has an outer wall having a plurality of flat lugs positioned angularly, about said axis, at a distance from a zone of the perimeter where the radius of the fillet tends towards a maximum.

3. The turbine engine of claim 1, wherein:
the air inlet passage and a respective orifice of each of the plurality of bushes have centers through which respective straight lines pass, and
the radius of each fillet is maximum over an angular sector centered on the corresponding straight line, open towards the air inlet passage which air comes from, and ranging from 90 to 135°.

4. The turbine engine of claim 1, wherein each of the plurality of ducts has an inner diameter between 12 and 26 centimeters and the radius of the fillet varies from 0.5 to 7 centimeters.

5. The turbine engine of claim 1, wherein the radius of each of the plurality of fillets tends to a maximum at a place of a zone of the perimeter of said respective inner wall which is oriented towards the air inlet passage.

6. The turbine engine of claim 1, wherein each of the plurality of bushes is mounted on a respective orifice of the housing to be adjacent to said second wall of the housing, and has an outer wall provided, on a periphery, with at least one flat lug which, on at least one of the plurality of bushes, is positioned adjacent to said second wall of the housing, so as to position the plurality of orifices of the respective housing, the plurality of bushes, and the plurality of ducts as close to the outer casing of the turbine as possible.

7. The turbine engine of claim 1, wherein each of the plurality of bushes is mounted on a respective orifice of the housing and has, on a periphery, a plurality of flat lugs positioned angularly, about said axis, at a distance from said zone of the perimeter.

8. A turbine for a turbine engine, the turbine engine comprising:
a connecting assembly comprising:
a housing for distributing air between an air inlet passage of the housing and a plurality of ducts via a plurality of orifices of a first wall of the housing;
a plurality of bushes, each of said plurality of bushes connecting a respective one of the plurality of ducts to a respective one of the plurality of orifices to allow air to circulate in a first direction from the housing into the respective duct; and
a plurality of fillets each configured to connect an inner wall of a respective one of the plurality of bushes to a respective inside portion of said first wall of the housing, each of said plurality of fillets having a radius which varies over at least a part of a perimeter of said inner wall to change the direction of air from a second direction within the housing to the first direction, the first direction being different than the second direction; and
an outer casing of the turbine, about a zone of which is positioned the housing for distributing air, a second wall of which extends to be adjacent to said zone of the outer casing.

9. The turbine of claim 8, wherein each of said plurality of bushes has an outer wall having a plurality of flat lugs positioned angularly, about said axis, at a distance from a zone of the perimeter where the radius of the respective fillet of the plurality of fillets tends towards a maximum.

10. A turbine engine for an aircraft, comprising:
the turbine of claim 8, wherein each of the plurality of bushes is arranged such that air changing from the second direction to the first direction circulates in contact with an inner wall of said bush.

* * * * *